United States Patent Office 3,591,341
Patented July 6, 1971

3,591,341
STANNATE STABILIZER COMPOSITIONS CONTAINING A PYROPHOSPHATE AND ORTHOPHOSPHORIC ACID, THEIR PREPARATION, AND HYDROGEN PEROXIDE SOLUTIONS STABILIZED THEREWITH
Victor J. Reilly, Memphis, Tenn., assignor to E. I. du Pont de Nemours and Company, Wilmington, Del.
No Drawing. Filed July 24, 1968, Ser. No. 747,113
Int. Cl. B01j 1/16; C01b 15/02
U.S. Cl. 23—207.5
13 Claims

ABSTRACT OF THE DISCLOSURE

Aqueous stannate stabilizer compositions containing a stannate, a pyrophosphate and orthophosphoric acid in an amount sufficient to adjust the pH of the composition to 9–11, a method for their preparation, and hydrogen peroxide solutions stabilized therewith. The stabilizer compositions are especially useful for stabilizing hydrogen peroxide solutions containing at least 30% $H_2O_2$ to provide stable products which remain exceptionally stable when diluted to strengths of 2–10% $H_2O_2$ without further addition of any stabilizer.

BACKGROUND OF THE INVENTION

Most commercial hydrogen peroxide products are produced and sold initially as relatively high strength solutions containing $H_2O_2$ at concentrations from 30–75% or higher. A substantial portion of such high strength products are employed for a variety of uses for which it is customary to dilute the high strength product to a substantially lower strength, e.g., 2–10%, at which it may then be stored for substantial periods of time before ultimate use. Peroxide solutions diluted in this manner are widely used for hair bleaching, in hair dyeing, as an agent in hair waving, as a mild antiseptic, etc. It is well-known that dilute hydrogen peroxide solutions are inherently more difficult to stabilize against peroxide decomposition than are the more concentrated or high strength solutions. Because of this, dilute solutions intended for storage prior to ultimate use have generally required special stabilizer formations to provide satisfactory shelf life.

Most high strength peroxide solutions are stabilized by the addition of stannate stabilizers. Although stannate stabilizers are highly effective, it has been customary and considered necessary to add supplementary stabilizers to such high strength solutions when diluting to the customary 2–10% strengths normally employed for the uses indicated above. The most commonly used or proposed supplementary stabilizers are phenacetin (acetophenetidin) and acetanilide. The addition of such supplemental stabilizers represents an added processing step that the purchasers of the initial high strength peroxide must carry out. In addition to that disadvantage, such supplemental stabilizers are attacked in time by the peroxide so that the diluted product tends to lose its stability during storage.

It has long been known that small amounts of impurities, especially heavy metal ions, actively catalyze the decomposition of hydrogen peroxide. It has also been known that stannates are highly effective stabilizers against such decomposition. Thus, Liebknecht et al. U.S. Pat. 1,213,921 proposed the use of precipitated stannic acid as a stabilizer; however, the soluble stannates, are proposed in Reichert U.S. Pat. 1,958,204, are generally more effective and have been widely used to stabilize acidic high strength hydrogen peroxide solutions of commerce.

The effectiveness of stannate stabilizers depends, to a considerable extent, upon the stannate stabilizer composition employed and the way in which it is prepared. The above Reichert patent discloses simply adding a sodium stannate solution to the peroxide, preferably along with a separately added solution of sodium pyrophosphate in order to prevent precipitation of tin compounds in the peroxide solution. The patent discloses that the effectiveness of the stannate solution can be improved somewhat by permitting it to age before use, which aging can be accelerated by heating. Baker U.S. Pat. 2,904,517 discloses stannate stabilizer compositions prepared by dissolving sodium stannate together with sodium pyrophosphate and ammonium nitrate in water and adjusting the pH of the resulting solution to an alkaline pH less than 9 in order to avoid formation of a permanent precipitate. Meeker U.S. Pat. 3,114,606 shows the stabilization of hydrogen peroxide solution by the addition thereto of an aqueous solution of a soluble stannate and a tin complexing agent, which solution is acidified to a pH less than 5 before its use. Young U.S. Pat. 3,333,925 discloses a relatively complicated method for preparing a stannate stabilizer composition which contains both a sodium pyrophosphate and a sodium polymetaphosphate $(NaPO_3)_x$, in certain proportions and has a pH of 5–8.

While the stabilizer compositions obtained by the methods of the above patents are fairly effective, the procedures for their preparation, in at least some instances, are fairly complex and the resulting compositions are not generally as effective as desired when the relatively high strength solutions stabilized therewith are diluted to strengths on the order of 2–10% $H_2O_2$.

The present invention is based upon the discovery of a relatively simple method of preparing stannate stabilizer compositions which can be used to stabilize relatively high strength peroxide solutions that can be diluted to yield low strength solutions having outstanding stability without the addition of any supplemental stabilizer.

SUMMARY OF THE INVENTION

The stabilizer compositions of the invention consist essentially of aqueous solutions containing: an alkali metal of ammonium stannate at a concentration, calculated as $Na_2SnO_3 \cdot 3H_2O$, of at least 0.5, e.g., 2–25, weight percent; at least 0.2, e.g., 0.2–5 parts by weight of an alkali metal or ammonium pyrophosphate, calculated as

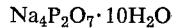

$$Na_4P_2O_7 \cdot 10H_2O$$

per part of said stannate, calculated as $Na_2SnO_3 \cdot 3H_2O$; and sufficient orthophosphoric acid to impart to the composition a pH of 9–11.

Such stannate stabilizer compositions are prepared by forming an aqueous solution of an ammonium or alkali metal stannate and an ammonium or alkali metal pyrophosphate in the proportions relative to each other stated above, and then adding orthophosphoric acid to the resulting solution in an amount such that the pH of the solution will be adjusted to a value within the range 9–11, preferably 9.5–10.5.

The hydrogen peroxide solutions stabilized in accordance with the invention are acidic solutions to which have been added an amount of a stabilizer composition prepared as above as will provide in the peroxide solution at least 5 e.g., from 5–2000, mg. of stannate, calculated as $Na_2SnO_3 \cdot 3H_2O$, per liter of the solution.

DETAILED DESCRIPTION AND PREFERRED EMBODIMENTS

The stannate employed in preparing the stabilizer compositions may be ammonium stannate or an alkali metal stannate. The preferred stannate is sodium stannate. In the preparation of the composition, the aqueous solution of the stannate should contain the stannate at a concentration of at least 0.5 weight percent, the preferred concentrations being 2–25 weight percent. However, higher concentrations up to the limit of solubility of the stannate can be employed. All stannate concentrations reported herein are calculated as $Na_2SnO_3 \cdot 3H_2O$. The stannate solution should also contain a soluble pyrophosphate which may be an ammonium pyrophosphate or an alkali metal pyrophosphate. The pyrophosphate may be a fully neutralized pyrophosphate such as tetrasodium pyrophosphate ($Na_4P_2O_7$), or a partially neutralized pyrophosphate such as disodium dihydrogen pyrophosphate ($Na_2H_2P_2O_7$). The solution should contain at least 0.2 part, e.g., 0.2–5 parts, of the pyrophosphate, calculated as $Na_4P_2O_7 \cdot 10H_2O$, for each part by weight of the stannate, calculated as $Na_2SnO_3 \cdot 3H_2O$. Preferably, there will be present at least 0.5 part, e.g., 0.5–2 parts, of the pyrophosphate for each part of the stannate. The aqueous solution containing the stannate and the pyrophosphate in the proportions indicated will normally have a pH of about 11.7 where the pyrophosphate is a fully neutralized one such as $Na_4P_2O_7$. In order to complete the preparation of the stabilizer composition, the initial stannate-pyrophosphate solution should have its pH adjusted downwardly by the addition thereto of orthophosphoric acid ($H_3PO_4$) in such an amount as will result in a solution pH falling within the range 9–11, preferably 9.5–10.5. If the pH is adjusted to a value outside this range, the resulting composition is much less effective as a stabilizer for hydrogen peroxide solutions, particularly after dilution of the stabilized solution to a peroxide concentration of from 2–10% by weight.

While the stannate stabilizer compositions of the invention may be employed to stabilize any acidic hydrogen peroxide solution of any desired $H_2O_2$ concentration, they are especially effective for stabilizing higher strength solutions, e.g., solutions containing at least 30 weight percent $H_2O_2$, to provide stabilized products which can be diluted to lower strength products, especially solutions containing about 2–10 weight percent $H_2O_2$, having excellent stabilities. If no dilution of the originally stabilized peroxide solution is contemplated, the amount of the stabilizer composition added to the peroxide solution should provide in the peroxide solution a stannate concentration, calculated as $Na_2SnO_3 \cdot 3H_2O$, of at least 5 mg. per liter, although higher concentrations, e.g., at least 50 mg. per liter, generally will be preferred. Most generally, the stabilizer compositions will be employed for stabilizing high strength peroxide solutions, e.g., solutions containing from 30–75 weight percent $H_2O_2$ or more, which solutions are intended to be diluted to low strength solutions, e.g., 2–10 weight percent $H_2O_2$. For such purposes, the stabilizer composition preferably will be added to the high strength peroxide solution in an amount to provide therein a stannate concentration, calculated as $$Na_2SnO_3 \cdot 3H_2O,$$

of at least 100 mg. per liter and, most preferably, from 500–2000 mg. per liter. Of course, whatever amounts of the stannate composition are used, the weight ratio of pyrophosphate to stannate in the stabilized peroxide solution will be the same as the weight ratio of those components in the stannate stabilizer composition employed.

The stannate stabilizer compositions of the invention, their preparation, and their use in stabilizing hydrogen peroxide solutions, are illustrated in the following examples in which all composition percentages are by weight. De-ionized water was used in preparing all stannate solutions described and for effecting all dilutions indicated. All pH values reported were apparent values as determined by direct meter readings using a glass electrode.

In the following examples, stabilities are shown for peroxide solutions after dilution and contamination. This is done to accentuate the differences in effectiveness of the various stabilizer systems. This is a useful measure, since one of the principal purposes of the stabilizer is to protect against accidental contamination of the peroxide solution. Since various metal ions have differing degrees of effect in catalyzing decomposition of the peroxide, a mixture of contaminants was used. The stabilities of all the uncontaminated solutions, before or after dilution, were good, being 0.03% loss of $H_2O_2$ per hour, or less, at 100° C.

Example 1

(a) A freshly prepared 35% solution of hydrogen peroxide was stabilized in a conventional manner by the sequential addition thereto of 50 mg. $Na_4P_2O_7 \cdot 10H_2O$ and 100 mg. $Na_2SnO_3 \cdot 3H_2O$ per liter. As is customary practice, there also was added to the solution 20 mg. of ammonium nitrate per liter to protect against corrosion of aluminum by the solution in the event of chloride contamination, since aluminum containers are often used in the shipping and storage of hydrogen peroxide. The pH of the peroxide solution was then adjusted to 3.5 by the addition of orthophosphoric acid. As is conventional practice, when such a stabilized solution is diluted to strengths in the range 2–10% $H_2O_2$ for cosmetic or pharmaceutical uses, a supplemental stabilizer was added. The hydrogen peroxide solution was diluted with water to a peroxide concentration of 6%. Then, to one part of the diluted peroxide solution there was added 2.6 grams of acetanilide while to the other part there was added a like amount of phenacetin per liter of the original 35% peroxide solution. Each diluted solution was then contaminated by the addition thereto of ferric ammonium sulfate, potassium chromate, cupric sulfate, manganous sulfate and aluminum potassium sulfate, in amounts to provide in the solutions the following metal concentrations, in mg. per liter: Fe, 0.25; Cr, 0.012; Cu, 0.05; Mn, 0.025; and Al, 0.25. Following adjustment of the pH of the contaminated solutions to 4.3–4.4 by the addition of orthophosphoric acid, the stabilities of the contaminated diluted solutions were determined by observing the volume of oxygen released in samples of the solution at 100° C. for periods up to 24 hours as a measure of the rate of peroxide decomposition. The rates of decomposition found, expressed as percent of the $H_2O_2$ lost per hour, are shown below:

| Supplemental stabilizer Added | Average rate, 1st 4 hours | Rate in 6th hour |
|---|---|---|
| Acetanilide, percent | 0.8 | 2.7 |
| Phenacetin, percent | 0.5 | 1.2 |

The above data show that with each of the supplemental stabilizers employed, the stability decreased with time, indicating attack by the peroxide on the organic stabilizer. Over long periods of storage, as commonly occurs on drug store shelves, the stabilizing effect of such supplemental stabilizers is largely lost.

(b) A quantity of freshly prepared unstabilized 35% hydrogen peroxide was stabilized by the sequential addition, first of 660 mg. of $Na_4P_2O_7 \cdot 10H_2O$, then 660 mg. of $Na_2SnO_3 \cdot H_2O$ per liter of the 35% $H_2O_2$. Twenty mg. of ammonium nitrate were also added and the pH of the resulting solution was then adjusted to 3.5 by the addition of orthophosphoric acid. The resulting stabilized solution was diluted to 6% with de-ionized water, then contaminated as indicated in part (a). After adjusting its pH to 4.3–4.4 the diluted solution was found to lose 0.75% of its hydrogen perioxide per hour at 100° C. When a prepared 70% hydrogen peroxide solution was stabilized in a similar manner with 1500 mg. each of $Na_2SnO_3 \cdot 3H_2O$ per liter and $Na_4P_2O_7 \cdot 10H_2O$, and 40 mg. $NH_4NO_3$ per liter, then diluted and contaminated as above, its loss of $H_2O_2$ at 100° C. was found to be at a rate of 1% per hour. These results show that merely increasing the concentration of stannate and pyprophosphate in 35% or 70% hydrogen peroxide when stabilized by conventional methods, does not yield a diluted product of outstanding stability. This will be seen by comparing the results for this part (b) with those of part (c) below.

(c) A stabilizer composition was prepared in accordance with the invention by dissolving 3.5 grams of $Na_4P_2O_7 \cdot 10H_2O$ in 100 grams of water, then dissolving in the resulting solution, 3.5 grams of $Na_2SnO_3 \cdot 3H_2O$. The pH (11.7) of the resulting solution was then adjusted to 9 by the addition of orthophosphoric acid. The resulting stabilizer composition was then added to a freshly prepared unstabilized 70% hydrogen peroxide solution in an amount to provide therein 1500 mg. per liter each of $Na_4P_2O_7 \cdot 10H_2O$ and $Na_2SnO_3 \cdot 3H_2O$, following which the pH of the peroxide solution was adjusted to 1 by means of orthophosphoric acid. The thus stabilized solution was diluted to 6% $H_2O_2$ and the resulting solution was then contaminated as described in part (b). Following adjustment of its pH to 4.3–4.4, the stability at 100° C. of the contaminated solution was determined. The average $H_2O_2$ decomposition rate during the first 4 hours and the first 24 hours were the same, i.e., 0.3%. Compared to the results reported in parts (a) and (b), this much lower rate of decomposition clearly shows the superior effectiveness of the stabilizer composition prepared as here described.

Example 2

Various stabilizer compositions were prepared as generally described in part (c) of Example 1, except that the pH values to which the composition were adjusted by the addition of orthophosphoric acid was varied over the range pH 2 to pH 11.7. In most instances following the pH adjustment with orthophosphoric acid, the resulting stabilizer composition (referred to simply as the "stabilizer" in the tabulation below) was aged by heating for 2 hours at a temperature of 85–95° C. A few of the compositions, however, were not so heated. Following preparation of the compositions, each was employed to stabilize a portion of a freshly prepared 70% hydrogen peroxide solution as indicated in part (c) of Example 1. The resulting stabilized solutions were diluted to 6% $H_2O_2$ solutions, and the diluted solutions were then contaminated and their pH values were adjusted as described in Example 1. All of the diluted solutions were then subjected to the 100° C. stability test with the results reported below. Since the rates of decomposition of the diluted and contaminated solutions did not change appreciably with time, only one peroxide decomposition rate is reported for each solution.

| Stabilizer adjusted to pH | Percent $H_2O_2$ lost/hr. at 100°C. | |
| --- | --- | --- |
| | Stabilizer heated | Stabilizer not heated |
| 11.7 [1] | (²) | 2.3 |
| 11.5 | (²) | 2.4 |
| 11.0 | (²) | 0.1 |
| 10.5 | ³ 0.2 | 0.1 |
| 10.0 | ³ 0.2 | 0.2 |
| 9.5 | 0.3 | 0.3 |
| 9.1 | 0.2 | 1.2 |
| 8 | 1.1 | 1.1 |
| 7 | 1.7 | 2.3 |
| 5 | 2.2 | [4] |
| 2.0 | 1.3 | 2.3 |

[1] No pH adjustment.
[2] Stability test was not run because stabilizer solution formed precipitate when heated, and precipitate did not redissolve on adding to the 70% $H_2O_2$.
[3] Stabilizer solution formed a precipitate on heating, but precipitate redissolved on adding to 70% $H_2O_2$.
[4] Not run.

As can be seen from the above table of results, the stabilizer compositions whose pH had been adjusted to a value not lower than 9 and not higher than 11 yielded stabilized peroxide solutions which, upon dilution, retained outstanding stabilities even though highly contaminated. The data show that adjustment of the pH to a value within the range 9–11 is quite critical. The data also show that the range of the stabilizer composition by heating is most valuable when the pH has been adjusted to the lower portion of the above critical range, whereas very good results can be obtained over the entire critical range whether or not the composition is heated. Instead of an accelerated aging by heating, e.g., for ¼–2 hours at a temperature from about 70° C. to the boiling point, the stabilizer composition can be aged by storage at ordinary temperature for several, e.g., 2–10, days.

As will be seen from the above examples, the stabilizer compositions of the invention can be prepared readily by simple procedures and they can be employed to stabilize high strength peroxide which can be deluted to low strength products having excellent stabilities without requiring the use of any supplemental stabilizer. Furthermore, the stabilizing effectiveness of the stabilizer composition does not deteriorate in time in the presence of the peroxide solution which is being stabilized.

The stabilities reported for the peroxide solutions stabilized in accordance with the invention are excellent stabilities considering the fact that the peroxide solutions tested were deliberately contaminated with a combination of heavy metal contaminants at concentrations known to be highly active in catalyzing the decomposition of hydrogen peroxide.

The hydrogen peroxide solution that is stabilized in accordance with the invention should be acidic and generally should have a pH not higher than 6. The pH of a hydrogen peroxide solution will vary depending upon its $H_2O_2$ content and, as disclosed in Elston U.S. Pat. 2,497,814, the stability of a hydrogen peroxide solution is generally greatest at about that pH which represents its so-called equivalence point. Thus, the equivalence points, and the pH values of 30%, 50% and 70% $H_2O_2$ solutions at which they are most stable are, respectively, the apparent pH values of 4.0, 2.7 and 1.5, as determined by direct meter readings using a glass electrode. It is, therefore, preferred to adjust the pH of peroxide solutions stabilized in accordance with the invention, to a pH value which is not more than about 2 pH units either above or below the pH representing the equivalence point of the solution. For solutions containing at least 30% $H_2O_2$, e.g., 30–75% solutions, pH values not more than 1.5 units above or below the equivalent point are most preferred; but for more dilute solutions, particularly those containing from about 2–10% $H_2O_2$, it is most preferred that the pH be not higher than about 5, e.g., about 4 to 4.6, to insure against the pH becoming unduly high due to the subsequent contamination with alkaline materials, particularly during storage in glass containers. Adjustment of the pH to values within the limits indicated, where necessary, can be effected by the addition of any suitable acid such as nitric acid, sulfuric acid, orthophosphoric acid (preferred), lactic acid, citric acid or the like, or by the addition of any suitable alkaline material such as the alkali metal or ammonium hydroxides, carbonates or bicarbonates. Since stabilization is effected by the addition of the alkaline stabilizer composition to the peroxide solution, adjustment of the pH of the resulting peroxide solution to the preferred values indicated above will generally require the addition of an acid, and the preferred acid for this purpose is orthophosphoric acid.

In preparing the stannate stabilizer compositions of the invention, the stannate and pyrophosphate components thereof may be dissolved simultaneously or sequentially in any order, following which orthophosphoric acid is added to the solution containing both to adjust the pH of the solution to a value within the range 9 to 11, preferably 9.5 to 10.5. If the composition is to be used to stabilize a hydrogen peroxide solution that is to be stored or handled in aluminum containers or equipment, an alkali metal or ammonium nitrate can advantageously be included in the stabilizer composition to inhibit corrosion of the aluminum by the peroxide solution due to chloride impurities. However, the effectiveness of the composition to stabilize peroxide against decomposition is not affected in any way by the presence of such a nitrate, and the nitrate may be added at any stage in the preparation of the composition or to the pre-formed stannate-pyrophosphate-orthophosphoric acid solution. Alternatively, the nitrate may be added separately to the peroxide solution if inhibition against aluminum corrosion is desired.

I claim:

1. The method of preparing a hydrogen peroxide stabilizer composition comprising providing an aqueous solution of an alkali metal or ammonium stannate containing at least 0.5 weight percent of said stannate, calculated as $Na_2SnO_3 \cdot 3H_2O$; and at least 0.2 part by weight of an alkali metal or ammonium pyrophosphate, calculated as $Na_4P_2O_7 \cdot 10H_2O$, per part of said stannate, calculated as $Na_2SnO_3 \cdot 3H_2O$, and adding to said solution orthophosphoric acid in an amount such that the pH of said solution will be adjusted to a value within the range 9 to 11.

2. The method of claim 1 wherein the stannate is sodium stannate and the pyrophosphate is tetrasodium pyrophosphate.

3. The method of claim 1 wherein the pH is adjusted to a value in the range 9.5–10.5.

4. The method of claim 2 wherein the solution contains 2–25 weight percent sodium stannate and 0.2–5 parts tetrasodium pyrophosphate per part of sodium stannate.

5. The method of claim 4 wherein the pH is adjusted to a value in the range 9.5–10.5.

6. A stannate hydrogen peroxide stabilizer composition consisting essentially of an aqueous solution of an alkali metal or ammonium stannate containing at least 0.5 weight percent of said stannate, calculated as $$Na_2SnO_3 \cdot 3H_2O$$

at least 0.2 part by weight of an alkali metal or ammonium pyrophosphate, calculated as $Na_4P_2O_7 \cdot 10H_2O$, per part of said stannate, calculated as $Na_2SnO_3 \cdot 3H_2O$; and an amount of orthophosphoric acid to give a pH of 9 to 11.

7. The composition of calim 6 wherein the stannate is sodium stannate and the pyrophosphate is tetrasodium pyrophosphate.

8. The composition of claim 6 which contains 2–25 weight percent sodium stannate and 0.2–5 parts tetrasodium pyrophosphate per part of sodium stannate.

9. The composition of claim 6 wherein the amount of orthophosphoric acid gives a pH of 9.5 to 10.5.

10. An acidic aqueous hydrogen peroxide solution containing an alkali metal or ammonium stannate at a concentration, calculated as $Na_2SnO_3 \cdot 3H_2O$, of at least 5 mg. per liter, said stannate having been supplied to said solution as a stannate stabilizer composition consisting essentially of an aqueous solution of an alkali metal or ammonium stannate containing: at least 0.5 weight percent of said stannate, calculated as $Na_2SnO_3 \cdot H_2O$; at least 0.2 part by weight of an alkali metal or ammonium pyrophosphate, calculated as $Na_4P_2O_7 \cdot 10H_2O$, per part of said stannate, calculated as $Na_2SnO_3 \cdot 3H_2O$; and an amount of orthophosphoric acid to give to said stabilizer composition a pH of 9 to 11.

11. An acidic aqueous hydrogen peroxide solution according to claim 10, said solution having a pH not higher than 6 and not more than 2 pH units above or below that pH which represents the equivalence point of said solution, which solution contains an alkali metal or ammonium stannate at a concentration, calculated as $Na_2SnO_3 \cdot 3H_2O$, of at least 50 mg. per liter, said stannate having been supplied to said solution as a stannate stabilizer composition consisting essentially of an aqueous solution of an alkali metal or ammonium stannate containing: at least 0.5 weight percent of said stannate, calculated as $Na_2SnO_3 \cdot 3H_2O$; at least 0.2 part by weight of an alkali metal or ammonium pyrophosphate, calculated as $Na_4P_2O_7 \cdot 10H_2O$, per part of said stannate, calculated as $Na_2SnO_3 \cdot 3H_2O$; and an amount of orthophosphoric acid to give to said stabilizer composition a pH of 9 to 11.

12. An acidic aqueous hydrogen peroxide solution according to claim 11, said solution containing at least 30 weight percent $H_2O_2$ and at least 100 mg. per liter of sodium stannate, calculated as $Na_2SnO_3 \cdot 3H_2O$, supplied to said solution as a stannate stabilizer composition consisting essentially of an aqueous solution of sodium stannate containing: at least 0.5 weight percent of sodium stannate, calculated as $Na_2SnO_3 \cdot 3H_2O$; at least 0.2 part by weight of sodium pyrophosphate, calculated as $Na_4P_2O_7 \cdot 10H_2O$, per part of said stannate, calculated as $Na_2SnO_3 \cdot 3H_2O$; and an amount of orthophosphoric acid to give to said stabilizer composition a pH of 9 to 11.

13. An acidic aqueous hydrogen peroxide solution according to claim 12 containing 30–75 weight percent $H_2O_2$ and 500–2000 mg. per liter of sodium stannate, calculated as $Na_2SnO_3 \cdot 3H_2O$, supplied to said solution as a stannate stabilizer composition consisting essentially of an aqueous solution of sodium stannate containing: at least 0.5 weight percent of sodium stannate, calculated as $Na_2SnO_3 \cdot H_2O$; at 0.2 part of sodium pyrophosphate, calculated as $Na_4P_2O_7 \cdot 10H_2O$, per part of said sodium stannate, calculated as $Na_2SnO_3 \cdot 3H_2O$; and an amount of orthophosphoric acid to give to said stabilizer composition a pH of 9.5 to 10.5.

References Cited

UNITED STATES PATENTS

| 2,783,132 | 2/1957 | Panepinto | 23—207.5 |
| 2,904,517 | 9/1959 | Baker | 23—207.5 |

FOREIGN PATENTS

| 642,845 | 6/1962 | Canada | 23—207.5 |

OSCAR R. VERTIZ, Primary Examiner

H. S. MILLER, Assistant Examiner

U.S. Cl. X.R.

252—397

PO-1050
(5/69)

UNITED STATES PATENT OFFICE
CERTIFICATE OF CORRECTION

Patent No. 3,591,341        Dated July 6, 1971

Inventor(s) Victor J. Reilly

It is certified that error appears in the above-identified patent and that said Letters Patent are hereby corrected as shown below:

Column 1, line 58, "attached" should be -- attacked --. Column 2, line 41, "of" should be -- or --. Column 4, line 57, "$Na_2SnO_3 \cdot H_2O$" should be -- $Na_2SnO_3 \cdot 3H_2O$ --; line 64 after "a" insert -- freshly --; line 71, "pyrophosphate" should be -- pyrophospate --. Column 5, line 73, "range" should be -- aging --. Column 6, line 10, "deluted" should be -- diluted --; line 41, "equivalent" should be -- equivalence --; line 46, after "to" delete -- the --. Column 7, line 38, "calim" should be -- claim --.

Signed and sealed this 22nd day of February 1972.

(SEAL)
Attest:

EDWARD M. FLETCHER, JR.
Attesting Officer

ROBERT GOTTSCHALK
Commissioner of Patents